United States Patent
Buhl et al.

(10) Patent No.: US 11,815,050 B2
(45) Date of Patent: Nov. 14, 2023

(54) DEVICE FOR SUPPLYING FUEL AND VEHICLE COMPRISING A DEVICE OF THIS TYPE

(71) Applicant: MAN Truck & Bus SE, Munich (DE)

(72) Inventors: Stefan Buhl, Munich (DE); Alexander Hofmann, Munich (DE)

(73) Assignee: MAN TRUCK & BUS SE, Munich (DE)

(*) Notice: Subject to any disclaimer, the term of this patent is extended or adjusted under 35 U.S.C. 154(b) by 0 days.

(21) Appl. No.: 17/802,939

(22) PCT Filed: Feb. 1, 2021

(86) PCT No.: PCT/EP2021/052298
§ 371 (c)(1),
(2) Date: Aug. 26, 2022

(87) PCT Pub. No.: WO2021/170344
PCT Pub. Date: Sep. 2, 2021

(65) Prior Publication Data
US 2023/0120575 A1   Apr. 20, 2023

(30) Foreign Application Priority Data
Feb. 26, 2020   (DE) ............ 10 2020 001 257.4

(51) Int. Cl.
*F02M 21/02* (2006.01)
*F17C 5/06* (2006.01)

(52) U.S. Cl.
CPC ............ *F02M 21/02* (2013.01); *F17C 5/06* (2013.01); *F17C 2205/0142* (2013.01);
(Continued)

(58) Field of Classification Search
CPC ... F02M 21/02; F17C 5/06; F17C 2205/0142; F17C 2221/012; F17C 2227/036;
(Continued)

(56) References Cited

U.S. PATENT DOCUMENTS 9,771,886 B2 * 9/2017 Garner ................. F02M 51/04
2006/0246177 A1   11/2006 Miki et al.
(Continued)

FOREIGN PATENT DOCUMENTS

DE   10237164 A1   2/2004
DE   10242804 A1   4/2004
(Continued)

OTHER PUBLICATIONS

German Search Report issued in German Patent Application No. 10 2020 001 257.4 dated Nov. 4, 2020. English translation not available.
(Continued)

*Primary Examiner* — Hai H Huynh
(74) *Attorney, Agent, or Firm* — WEBER ROSSELLI & CANNON LLP

(57) ABSTRACT

The invention relates to a device (10) for supplying a fuel consumer (1) of a vehicle (20) with a gaseous fuel. The device (10) comprises multiple pressure accumulators (2) for storing and providing pressurised fuel, as well as a discharge device (3), which fluidically connects the multiple pressure accumulators (2) with the fuel consumer (1). In order to advantageously allow for a utilisation of a temperature change occurring during a fuel discharge, preferably a discharge cold temperature released during the discharge of fuel, according to the invention, the discharge device (3) is thermally coupled to a coolant circuit (4) of the vehicle (20). The invention also relates to a vehicle (20) comprising a device (10) of this type.

18 Claims, 4 Drawing Sheets

Figure 1:
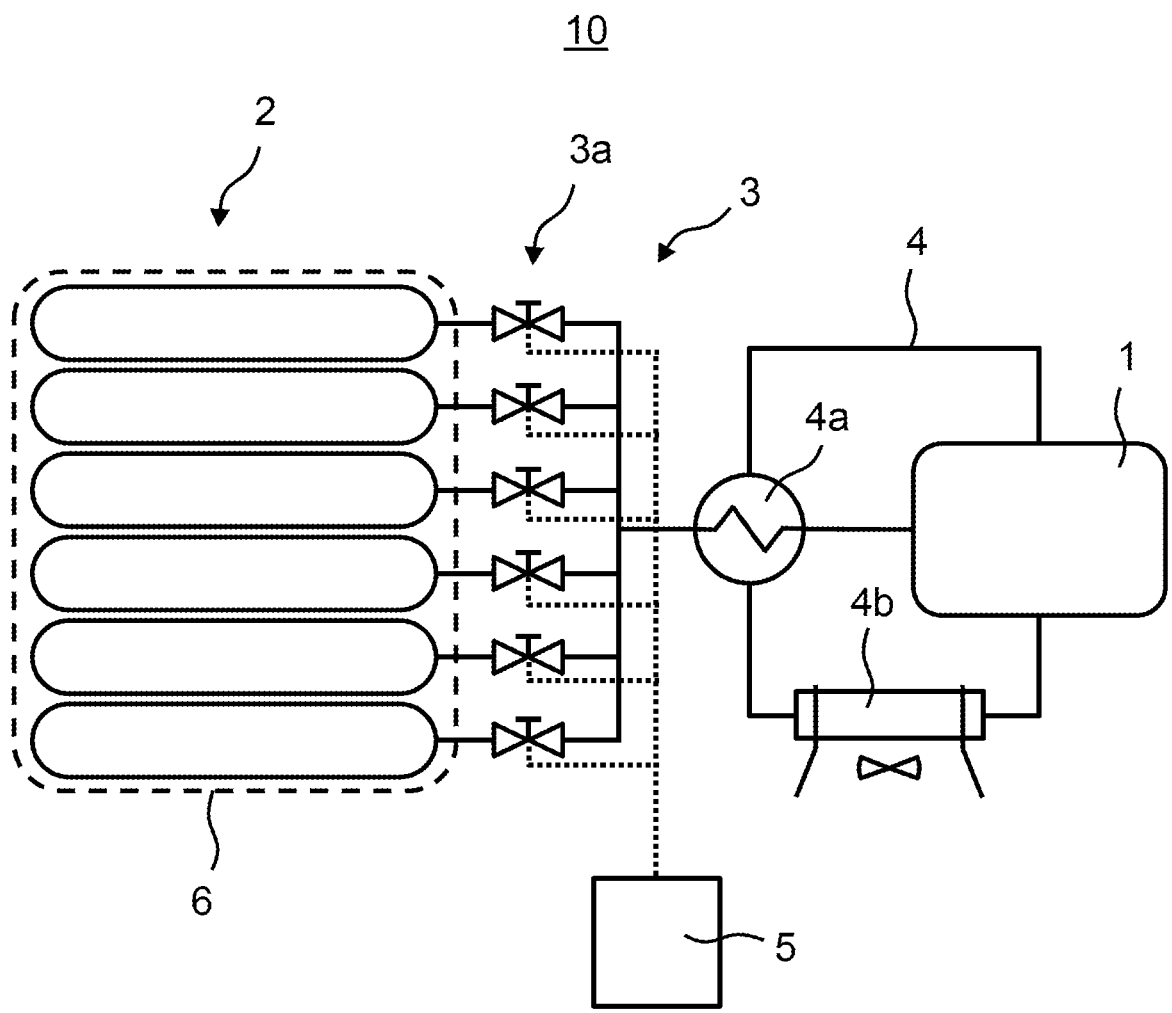

(52) U.S. Cl.
CPC .. *F17C 2221/012* (2013.01); *F17C 2227/036* (2013.01); *F17C 2227/042* (2013.01); *F17C 2250/0626* (2013.01); *F17C 2270/0171* (2013.01)

(58) Field of Classification Search
CPC ........ F17C 2227/042; F17C 2250/0626; F17C 2270/0171
USPC ....... 123/1 A, 2, 3, 525, 540, 541, 457, 510, 123/511, DIG. 12
See application file for complete search history.

(56) References Cited

U.S. PATENT DOCUMENTS

| | | |
|---|---|---|
| 2013/0206257 A1 | 8/2013 | Okawachi et al. |
| 2018/0313496 A1 | 11/2018 | Garner et al. |

FOREIGN PATENT DOCUMENTS

| | | |
|---|---|---|
| DE | 102004037851 A1 | 5/2005 |
| DE | 102008019466 A1 | 3/2010 |
| DE | 102014211503 A1 | 12/2015 |
| DE | 102015003028 A1 | 9/2016 |
| DE | 102018001298 A1 | 8/2019 |
| WO | 2011042215 A1 | 4/2011 |

OTHER PUBLICATIONS

International Search Report and Written Opinion issued in PCT/EP2021/052298 dated May 11, 2022, with English Translation.
Miguel, N. de [et al.]: The effect of defueling rate on the temperature evolution of onboard hydrogen tanks. In: International Journal of Hydrogen Energy, vol. 40, 2015, No. 42, S. 14768-14774.

\* cited by examiner

DEVICE FOR SUPPLYING FUEL AND VEHICLE COMPRISING A DEVICE OF THIS TYPE

CROSS-REFERENCE TO RELATED APPLICATIONS

This application is a 371 application of PCT/EP2021/052298 filed Feb. 1, 2021 which claims benefit of and priority to German Patent Application Serial No. DE1020200001257.4 filed Feb. 26, 2020, the disclosures of the above-identified applications are hereby incorporated by reference in their entirety.

The present disclosure relates to an apparatus for supplying a fuel consumer of a vehicle with gaseous fuel, and to a vehicle comprising an apparatus of this type.

A wide variety of concepts are known in the prior art for driving vehicles. In addition to the conversion of electrical energy into mechanical work by means of electric motors, the conversion of chemical energy, which is stored in the form of fuels, into mechanical work is particularly widespread. Fuels used here are fuels which are generally liquid under normal conditions, e.g. diesel, gasoline and/or kerosene; however, fuels which are gaseous even under standard conditions are increasingly being used, including, for example, hydrogen or natural gas (methane).

The last-mentioned fuels can be carried along or stored in the vehicle—in addition to storage in cryogenic liquefied form or embedding in a carrier material—in particular by powerful compression of the gases in pressure vessels, which is currently preferred by most vehicle manufacturers. The storage pressure level can be, for example, up to 700 bar. The subsequent introduction of the gaseous fuel into energy converters, for example a fuel cell or an internal combustion engine, subsequently takes place, however, generally at significantly lower pressures, and therefore a corresponding reduction in pressure generally takes place previously, which, for most gases, is associated with cooling and/or release of an expansion-induced refrigeration effect (Joule-Thomson effect).

Independently thereof, the gas remaining in the pressure vessel is cooled during the extraction. This results from the fact that primarily the most rapid particles of the gas compound escape out of the extraction opening, thus causing a drop in the average kinetic energy of the remaining gas particles and therefore as a whole the internal energy of the gas in the pressure vessel. In conjunction with said effect, which is referred to below as release of an extraction-induced refrigeration effect, a cooling of the gas from room temperature to up to $-40°$ C. has been measured for rapid emptying with high mass flows, e.g. when emptying hydrogen from commercially available tanks (operating pressure 700 bar) ("The effect of defueling rate on the temperature evolution of on-board hydrogen tanks" N. de Miguel et al. Int. J. Hydrogen Energ. 40, 14768, 2015). Said refrigeration effect is generally output unused to the vehicle environment and/or in the case of "conventional" extraction is too small to be able to be used for other cooling applications, e.g. the cooling of the internal combustion engine.

Accordingly, it is therefore the object of the present disclosure to provide a solution with which the disadvantages of the previous solutions can be avoided. In particular, it is an object of the present disclosure to provide a solution by means of which the overall efficiency of a vehicle operated with gaseous fuel can be increased.

These objects can be achieved with the features of the independent claims. Advantageous embodiments and applications of the present disclosure are the subject matter of the dependent claims and will be explained in more detail in the description below, in part with reference to the figures.

The basic concept of the present disclosure consists here in that targeted extraction from individual sections of the fuel accumulator results in as powerful a supercooling of the fuel within the tank as possible and in feeding said refrigeration effect into a cooling circuit of the vehicle.

For this purpose, according to a first independent solution concept, an apparatus is provided. The apparatus is preferably an apparatus for supplying a fuel consumer, for example a fuel cell and/or an internal combustion engine, of a vehicle with gaseous fuel (e.g. natural gas or hydrogen). The apparatus here comprises a plurality of pressure accumulators (e.g. compressed gas tanks) for storing and providing pressurized fuel. Merely by way of example, the fuel can be pressurized here with a pressure, which can also be referred to as storage pressure, of several hundred bar, for example 100 to 700 bar.

Furthermore, the apparatus comprises an extraction device which fluidically connects the plurality of pressure accumulators to the fuel consumer. For this purpose, the extraction device can have, for example, corresponding pipes and/or hose lines.

In order now in an advantageous manner to enable use of a temperature change occurring upon extraction of fuel, preferably an extraction-induced refrigeration effect which is released upon the extraction of fuel, the extraction device is thermally coupled to a cooling circuit of the vehicle. As stated above, the expression "extraction-induced refrigeration effect" can be understood here as meaning the decrease in heat of the fuel, which is induced by the extraction of fuel, in the corresponding pressure accumulators. The cooling circuit just mentioned is preferably a cooling circuit for cooling the fuel consumer. This is particularly advantageous since a high driving power (and therefore high generation of waste heat) is generally also associated with a correspondingly high extraction of fuel (and therefore a correspondingly high generation of an extraction-induced refrigeration effect).

According to a first aspect of the present disclosure, the extraction device can comprise a valve arrangement by means of which extraction of fuel from each of the plurality of pressure accumulators can be controlled individually. In other words, the valve arrangement can be designed to open and subsequently to close each of the plurality of pressure accumulators separately for extraction of fuel. In order to activate the valve arrangement, the extraction device according to this aspect can furthermore comprise a valve control device which, firstly, is designed to define a pressure accumulator subset which indicates from which of the plurality of pressure accumulators fuel is intended to be extracted, and, secondly, is designed to activate the valve arrangement depending on the defined pressure accumulator subset in such a manner that only fuel from the defined pressure accumulator subset is supplied to the fuel consumer. The defined pressure accumulator subset is preferably a genuine subset of the plurality of pressure accumulators. However, the defined pressure accumulator subset may possibly even comprise all of the pressure accumulators. By means of the aforementioned activation, a targeted generation of an extraction-induced refrigeration effect is made possible in an advantageous manner since, for example, by primary extraction from only a few pressure accumulators and the associated conventionally sharp pressure drop in said vessels, a greater cooling of the fuel can be generated than in the case of simultaneous extraction from all of the tanks.

According to a further aspect of the present disclosure, the valve control device can be designed to define the pressure accumulator subset in such a manner that an extraction-induced refrigeration effect which is released upon the extraction of fuel is maximized. In other words, as much an extraction-induced refrigeration effect as possible is intended to be released by the corresponding selection of the pressure accumulator subset. This can be determined, for example, by corresponding preliminary tests, with the released extraction-induced refrigeration effect being measured experimentally in each case for various pressure accumulator subsets and from this the pressure accumulator subset which maximizes the extraction-induced refrigeration effect under the given operating conditions being maximized. As a rule, this is brought about by an extraction from as few pressure accumulators as possible, i.e. a small pressure accumulator subset, since then the pressure drop and therefore the temperature decrease are maximized. However, a boundary condition here can be the actual fuel requirement of the fuel consumer, and therefore the expression "extraction" will be understood in expert terms to mean an extraction covering the requirement of the fuel consumer. By means of this feature, a high input of refrigeration effect into the cooling circuit can be realized in an advantageous manner.

According to a further aspect of the present disclosure, the valve control device can be designed to define the pressure accumulator subset, for increasing an extraction-induced refrigeration effect which is released upon the extraction of fuel, in such a manner that, upon the extraction of fuel, as high a pressure drop as possible takes place in the pressure accumulator subset. Since the pressure drop in the event of an extraction from a pressure accumulator generally correlates with the extracted quantity of gas, the valve control device can therefore be designed to define the pressure accumulator subset in such a manner that as high a quantity of gas as possible is extracted from the pressure accumulator subset.

In addition or alternatively, the valve control device can also be designed to define the pressure accumulator subset, for increasing an extraction-induced refrigeration effect which is released upon the extraction of fuel, in such a manner that, upon the extraction of fuel, a higher pressure drop takes place in the pressure accumulator subset than in the case of a uniform extraction from the plurality of pressure accumulators. The expression "uniform extraction" from the plurality of pressure accumulators means here that substantially the same amount of fuel is extracted from each of the plurality of pressure accumulators or that each of the plurality of pressure accumulators is emptied substantially in the same manner (same volume flow). In other words, the valve control device can be designed to define a genuine subset of the plurality of pressure accumulators as the pressure accumulator subset. In an advantageous manner, by means of the above ways of defining the pressure accumulator subset, a high input of refrigeration effect into the cooling circuit and thus a correspondingly high cooling power of the cooling circuit can be achieved in turn.

According to a further aspect of the present disclosure, the valve control device can be designed to define the pressure accumulator subset to be smaller, the greater the current heat input and/or heat input to be expected into the cooling circuit is. This preferably involves a heat input from a component to be cooled by the cooling circuit, e.g. the fuel consumer. If, for example, a high power and therefore correspondingly high generation of heat is to be expected at a component which is attached to the cooling circuit, it is advantageously possible, by appropriate reduction in the pressure accumulator subset, to increase the extraction-induced refrigeration effect generated by the latter and thereby to increase the input of the refrigeration effect into the cooling circuit.

In addition or alternatively, the valve control device can also be designed to define the pressure accumulator subset to be smaller, the greater a current desired cooling power and/or desired cooling power to be expected of the cooling circuit is. A desired cooling power can be understood here as meaning a variable which indicates how much heat energy per unit of time is intended to be removed as far as possible from the cooling circuit. In other words, the desired cooling power can also be understood as meaning the requirement for cooling power. Overall, a requirement-matching control of the extraction of fuel and the generation of a refrigeration effect is thereby advantageously achieved.

According to a further aspect of the present disclosure, the valve control device can be designed to empty the plurality of pressure accumulators successively in an extraction phase, i.e. in an operating phase in which fuel is extracted at least from some of the pressure accumulators. The expression "successively" is intended to refer here both to successive emptying of individual pressure accumulators; however, it is also intended to comprise successive emptying of pressure accumulator groups or pressure accumulator subsets. For example, according to this aspect, it is also possible for initially two pressure accumulators to be emptied, followed by a further two pressure accumulators, etc. Generally, a higher cooling power can thereby be advantageously obtained than would be the case during a simultaneous extraction from all of the pressure accumulators.

According to a further aspect of the present disclosure, the extraction device can be configured to undertake pressure equalization between the plurality of pressure accumulators in a non-extraction phase, i.e. in an operating phase in which fuel is specifically not extracted from any of the pressure accumulators. For example, the non-extraction phase can be an overrun operating phase and/or a recuperation phase of the vehicle. In an advantageous manner, possibly undesirably high pressure differences between the individual pressure accumulators can thereby be avoided or equalized again.

According to a further aspect of the present disclosure, the valve control device can be designed to define the pressure accumulator subset on the basis of a desired cooling power and/or temperature of the cooling circuit (e.g. a feed or return temperature of the coolant).

In addition or alternatively, the valve control device can also be designed to define the pressure accumulator subset on the basis of pressures and/or filling levels of the plurality of pressure accumulators. For example, the respective pressures of the individual pressure accumulators and/or the respective filling levels, i.e. the quantity of gas present in each of the pressure accumulators, can be taken into consideration in the definition of the pressure accumulator subset. In addition or alternatively, the valve control device can also be designed to define the pressure accumulator subset on the basis of a user specification and/or a fuel requirement of the fuel consumer. All of these parameters make it possible in an advantageous manner to supply fuel and generate a refrigeration effect as efficiently as possible and so as to meet requirements, with the exact target function or specification that is dependent on the operating phase and on the basis of which the pressure accumulator subset is intended to be defined being in turn able to be determined, for example, by means of suitable preliminary tests or test bench measurements.

In addition to a basic definition as to from which subset of the pressure accumulators fuel is intended to be extracted, the valve control device can advantageously also be configured to control "how much" fuel is intended to be extracted from the respective pressure accumulator. For example, in order to obtain a certain overall volume flow of fuel to the fuel accumulator, as high a partial volume flow as possible, i.e. as high an extracted volume of gas as possible per period of time, can be extracted from some of the pressure accumulators while only a small partial volume flow is extracted from other ones. For this purpose, according to a further aspect of the present disclosure, the valve arrangement can be designed to control partial volume flows from the individual pressure accumulators of the defined pressure accumulator subset depending on activation by the valve control device. In other words, the valve arrangement is intended to be able to permit a variation, preferably continuous or incrementally, in the volume flows of the respective pressure accumulators.

Furthermore, the valve control device can be designed in this connection to define the aforementioned partial volume flows in such a manner that an extraction-induced refrigeration effect which is released upon the extraction of fuel is maximized, i.e. as large an extraction-induced refrigeration effect as possible is released. The precise control specifications which are dependent, inter alia, on the specific configuration of the apparatus and the fuel used, can be determined here, for example, by experimental preliminary tests. In addition or alternatively, the valve control device in this connection can also be designed to define the partial volume flows for controlling the extraction-induced refrigeration effect, which is released upon the extraction of fuel, on the basis of a desired cooling power, a temperature of the cooling circuit, a user specification and/or a requirement of the fuel consumer and/or on the basis of pressures and/or filling levels of the plurality of pressure accumulators. In this connection, it can furthermore be advantageous for the pressure accumulator subset to comprise all of the pressure accumulators, i.e. that control of the extraction-induced refrigeration effect which is released upon the extraction of fuel takes place solely on the basis of the partial volume flows and not by an appropriate selection of pressure accumulators. This aspect advantageously also makes it possible as a whole for the extraction of fuel and the generation of the refrigeration effect to be controlled in a manner meeting requirements.

According to a further aspect of the present disclosure, it is possible for not all of the plurality of pressure accumulators to be pressurized with the same pressure. In other words, the storage pressure of the individual pressure accumulators of the plurality of pressure accumulators can vary. For example, one of the pressure accumulators can be pressurized with a storage pressure of 200 bar, and further with a storage pressure of 300 bar, and a third pressure accumulator with a storage pressure of 500 bar. Owing to the different starting pressure and the resultant different pressure differences upon the extraction, the temperature change and therefore the extraction-induced refrigeration effect which is generated can be influenced depending on the type of gas. Depending on whether a greater or lesser extraction-induced refrigeration effect is required, it is therefore possible for preliminary pressure accumulators with a lower or higher storage pressure to be emptied.

According to a further aspect of the present disclosure, the extraction device can comprise a pressure-reducing device for reducing the pressure of the pressurized fuel. The pressure-reducing device is preferably used for reducing the fuel, which is pressurized with storage pressure, to an operating pressure of the fuel consumer. In this connection, the pressure-reducing device can comprise, for example, at least one expansion valve or throttle valve which has a local constriction in the flow cross section. Furthermore, in this connection, for example, the abovementioned valve arrangement can be designed as a pressure-reducing device. In addition or alternatively, however, the pressure-reducing device can also be present in addition to the aforementioned valve arrangement in the apparatus for supplying the fuel consumer with gaseous fuel. It is thereby advantageously possible for the storage pressure to be reduced to the operating pressure of the fuel consumer while at the same time an expansion-induced refrigeration effect can be released which can then likewise be fed into the cooling circuit.

According to a further aspect of the present disclosure, the extraction device can be coupled via a heat exchanger, which may also be referred to as heat transfer medium, thermally to a coolant (e.g. water, oil and/or glycol) circulating in the cooling circuit. Concepts which are known per se in the prior art, including, for example, tubular heat exchangers, lamellar heat exchangers and/or plate heat exchangers, can be used here. As good a thermal coupling as possible can advantageously be ensured as a result. In this connection, it should be mentioned that the extraction of fuel primarily initially brings about cooling of the gas remaining in the corresponding pressure accumulators. However, further or continuing emptying of the corresponding pressure accumulators also results in gas which is (already) cooled being extracted, and therefore the heat exchanger does not have to be arranged directly at the pressure accumulators, but instead the thermal coupling to the cooling circuit can also be achieved by the extracted, preferably previously cooled, fuel flowing through.

In order, even in operating phases in which little fuel is extracted and therefore little extraction-induced refrigeration effect is released, to advantageously ensure a sufficient cooling power of the cooling circuit, according to a further aspect of the present disclosure the cooling circuit can additionally also comprise an air/coolant heat exchanger. By means of this component, which can also be referred to as air cooler, heat from the coolant is output to the environment independently of the release of an extraction-induced refrigeration effect upon the extraction of fuel. In addition or alternatively, the cooling circuit can also comprise a coolant pump. By means of the latter, a sufficient circulation of coolant in the cooling circuit can advantageously be ensured.

According to a further aspect of the present disclosure, the fuel can be hydrogen. In addition or alternatively, however, the fuel can also be, for example, natural gas, methane, ethane, butane and/or another fuel which is gaseous under normal conditions.

According to a further aspect of the present disclosure, the fuel consumer can comprise at least one fuel cell and/or an internal combustion engine. While a fuel cell is intended to be understood as meaning a galvanic element in which chemical energy is converted into electrical energy by electrochemical oxidation of the fuel, an internal combustion engine is intended to be understood as meaning a heat engine which performs mechanical work by internal combustion of fuel.

According to a further aspect of the present disclosure, the cooling circuit can be a cooling circuit for cooling the fuel consumer. As described above, this variant is particularly advantageous since a high motor power (and therefore a high generation of waste heat) is generally also associated with a correspondingly high extraction of fuel (and therefore a correspondingly high generation of an extraction-induced refrigeration effect). In addition or alternatively, the plurality of pressure accumulators can also be identical. As an alternative thereto, at least some of the plurality of pressure accumulators can differ, e.g. by design and/or size, from the remaining pressure accumulators. This last feature can advantageously facilitate, for example, accommodating the pressure accumulators in the vehicle. Furthermore, in addition or alternatively, the plurality of pressure accumulators can also be enclosed by a common housing. For this purpose, the pressure accumulators are preferably arranged adjacent and/or bordering one another. According to a further aspect of the present disclosure, the plurality of pressure accumulators can, however, also be spatially distributed and/or spaced apart spatially from one another in order thereby to advantageously facilitate, for example, accommodating them in the vehicle.

Furthermore, a vehicle is provided, having a fuel consumer (e.g. an internal combustion engine) and an apparatus for supplying the fuel consumer with gaseous fuel, as described in this document. The vehicle is preferably a utility vehicle. In other words, the vehicle can be a vehicle configured in terms of its design and setup for conveying people, for transporting goods or for towing trailer vehicles. For example, the vehicle can be a truck, a bus and/or a semitruck. In addition, however, the vehicle may also be a watercraft or aircraft.

Figure 2:
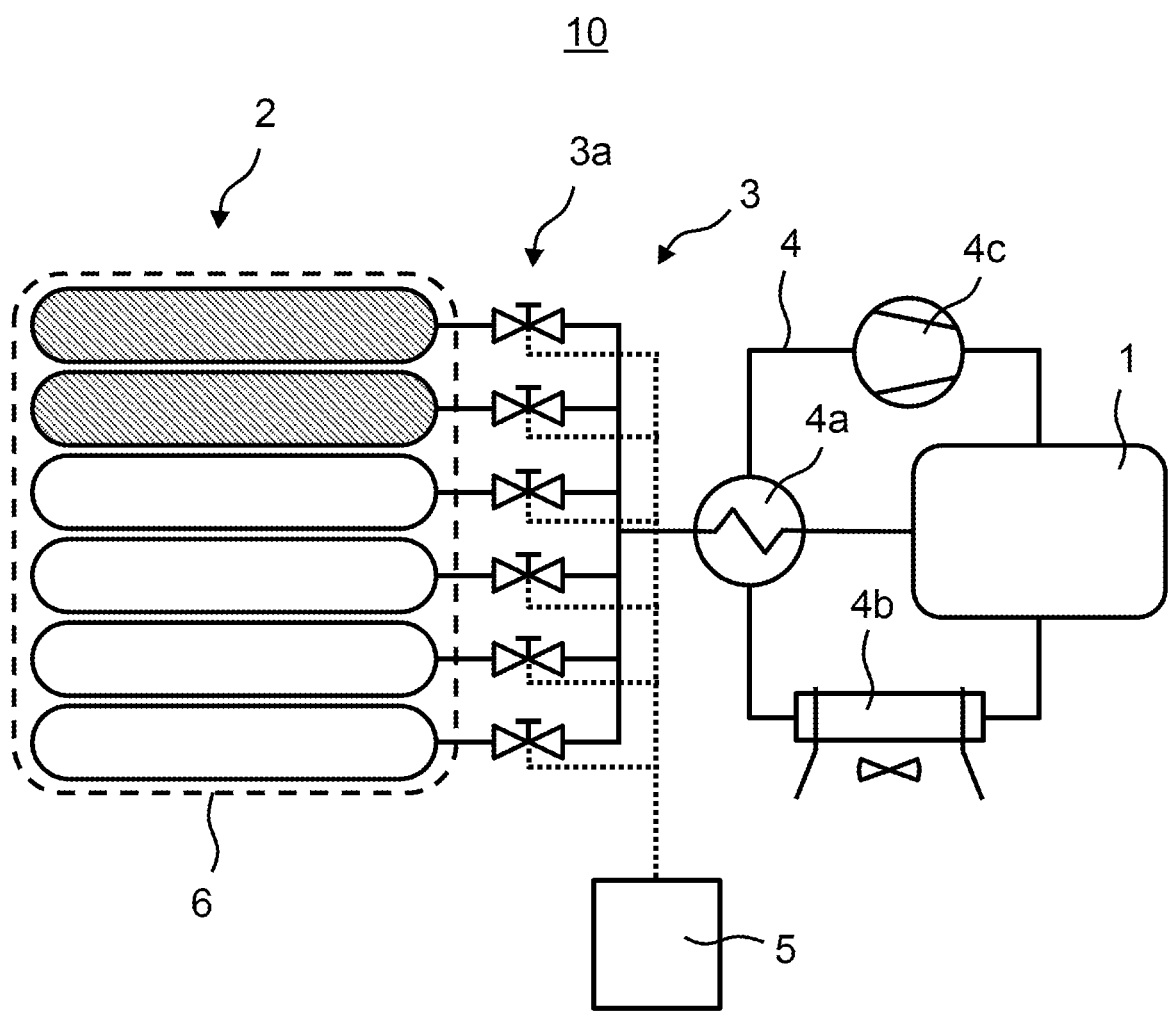
Figure 3:
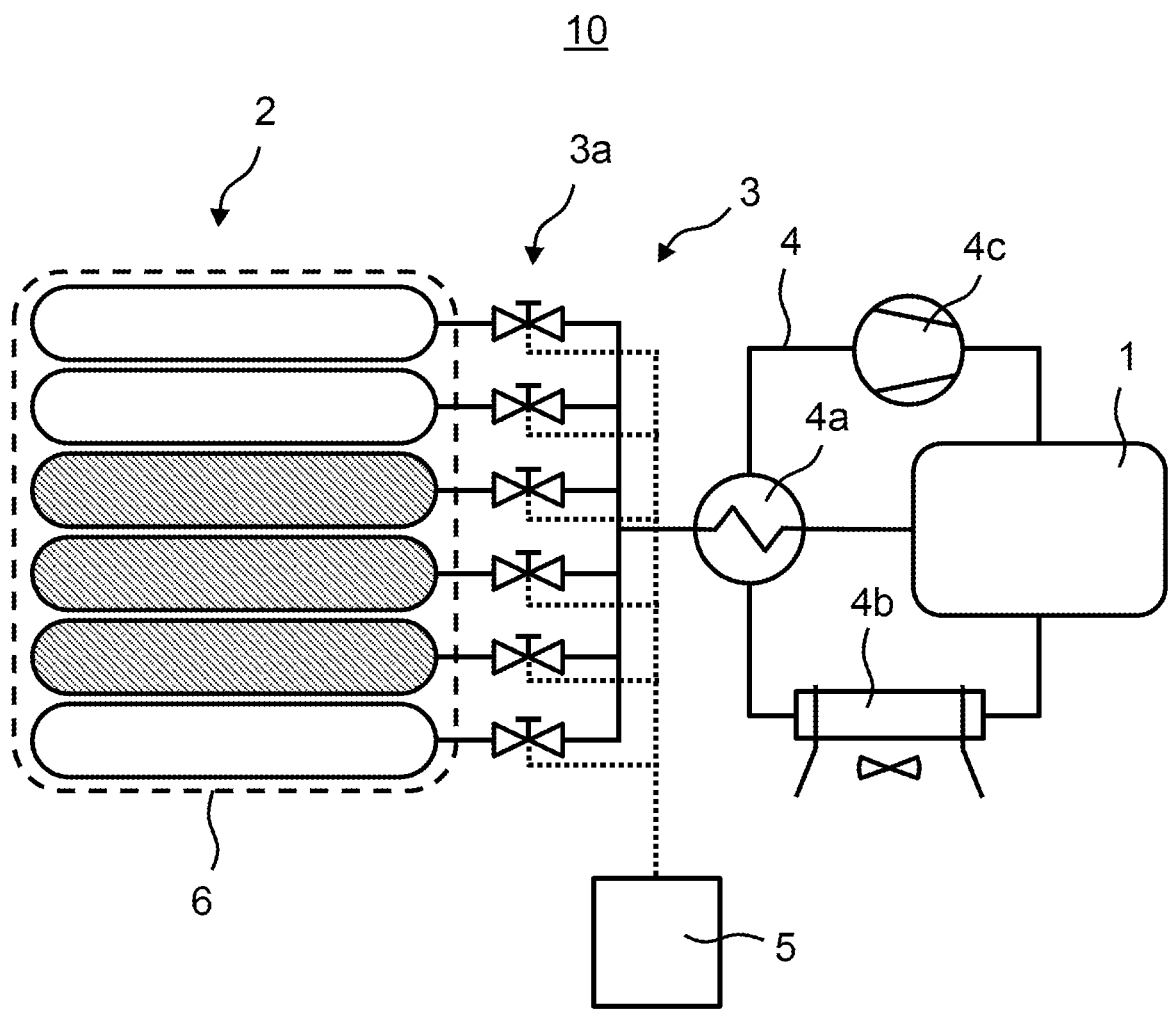
Figure 4:
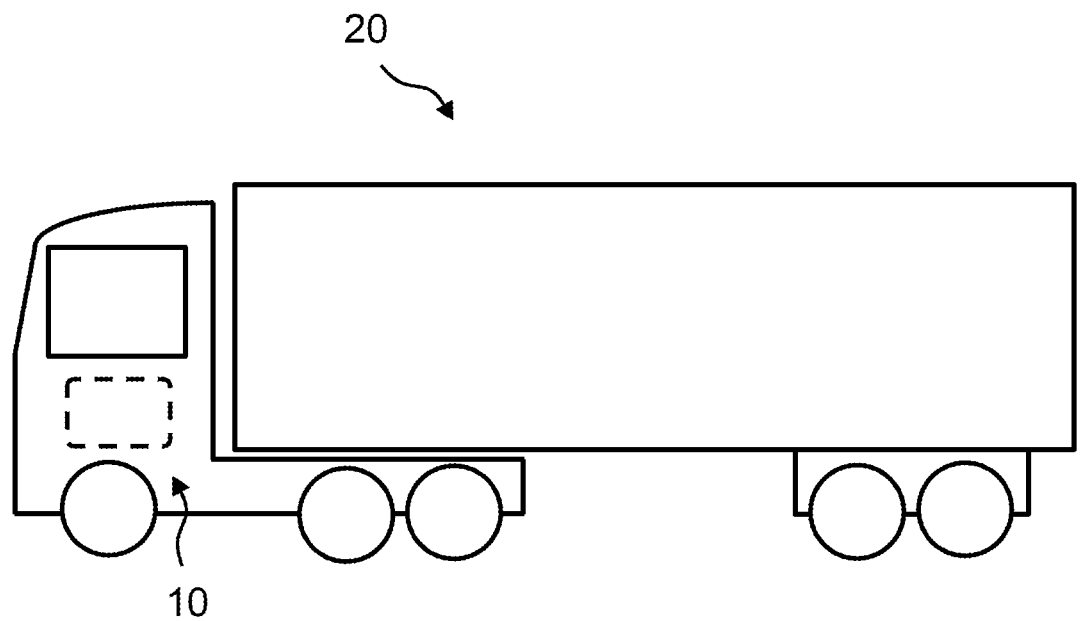

The previously described aspects and features of the present disclosure can be combined with one another as desired. Further details and advantages of the present disclosure will be described below with reference to the attached drawings, in which:

FIG. 1: shows a schematic illustration of an apparatus for supplying a fuel consumer of a vehicle with gaseous fuel according to a first embodiment of the present disclosure;

FIG. 2: shows a schematic illustration of an apparatus for supplying a fuel consumer of a vehicle with gaseous fuel according to a second embodiment of the present disclosure;

FIG. 3: shows a schematic illustration of the embodiment according to FIG. 2 in the event of extraction from another pressure accumulator subset; and FIG. 4: shows a schematic illustration of a motor vehicle in side view according to an embodiment of the present disclosure.

Identical or functionally equivalent elements are denoted with the same reference signs in all of the figures and in part are not described separately.

FIG. 1 shows a schematic illustration of an apparatus 10 for supplying a fuel consumer 1 (e.g. an internal combustion engine) of a vehicle 20 with gaseous fuel (e.g. natural gas) according to a first embodiment of the present disclosure. The apparatus 10 may also be referred to here as fuel supply apparatus. The apparatus 10 comprises a plurality of, here six, pressure accumulators 2, which are preferably enclosed by a common housing 6, for storing and providing pressurized fuel. Merely by way of example, the fuel (e.g. natural gas) can be pressurized with a pressure, which may also be referred to as storage pressure, of 200 bar.

Furthermore, the apparatus 10 comprises an extraction device 3 which fluidically connects the plurality of pressure accumulators 2 to the fuel consumer 1. For this purpose, merely by way of example, the extraction device 3 here has a plurality of pipes which each lead from the individual pressure accumulators 2 into a common supply line to the fuel consumer 1. In order in an advantageous manner to permit use of a temperature change which occurs upon extraction of fuel, preferably an extraction-induced refrigeration effect released upon the extraction of fuel, the extraction device 3 is thermally coupled to a cooling circuit 4 of the vehicle 20. The cooling circuit 4 here is by way of example a cooling circuit 4 for cooling the fuel consumer 1.

The thermal coupling between the extraction device 3 and the cooling circuit 4 takes place via a heat exchanger 4a through which firstly a coolant of the cooling circuit 4 as heat-dispensing medium and secondly, preferably supercooled, fuel as heat-absorbing medium can flow. For further cooling, the cooling circuit 4 can additionally also have an air/coolant heat exchanger 4b by means of which heat from the coolant can be output to the ambient air. Furthermore, the cooling circuit 4 can comprise a coolant pump 4c (not explicitly illustrated), wherein the latter can also be integrated in a component attached to the cooling circuit, e.g. in the fuel consumer 1. By means of the abovementioned coupling, preferably via the heat exchanger 4a, use is advantageously made possible of temperature changes of the fuel induced by the extraction of fuel since, in addition to the direct cooling of the fuel consumer 1 by the injection of, preferably supercooled, fuel, indirect cooling of the fuel consumer 1 via the extraction-induced refrigeration effect previously coupled into the cooling circuit 4 is made possible. Overall, an efficient operation of the vehicle 20 operated with gaseous fuel can thereby be achieved.

In order in an advantageous manner to enable control of the quantity of heat or refrigeration effect generated and therefore fed into the cooling circuit 4 (here via the heat exchanger 4a), the extraction device 3 of the apparatus 10 can furthermore be designed for targeted extraction of fuel from the plurality of pressure accumulators 2. For this purpose, the extraction device 3 can comprise a valve arrangement 3a by means of which extraction of fuel from each of the plurality of pressure accumulators 2 can be controlled individually. In other words, each of the plurality of pressure accumulators 2 can be opened and/or closed independently of the remaining pressure accumulators by means of the valve arrangement 3a. Via the valve arrangement 3a, the pressure of the respective storage pressure can also be reduced here at the same time to an operating pressure of the fuel consumer 1. That is to say, the valve arrangement 3a can simultaneously also serve as a pressure-reducing device. In addition or alternatively, however, the extraction device 3 can also comprise a pressure-reducing device in some way, e.g. in the vicinity of the heat exchanger 4a.

In order to activate the valve arrangement 3a, the extraction device 3 can furthermore comprise a valve control device 5 which is firstly designed to define a pressure accumulator subset which indicates from which of the plurality of pressure accumulators 2 fuel is intended to be removed, and secondly is designed to activate the valve arrangement 3a, depending on the defined pressure accumulator subset, in such a manner that only fuel from the defined pressure accumulator subset is supplied to the fuel consumer 1. By means of this targeted activation, in an advantageous manner, for example by individual pressure accumulators being emptied to a particularly great extent and/or primarily pressure accumulators with a currently high storage pressure being emptied, the temperature changes occurring upon the extraction are controlled in manner adapted to the current operating phase.

This targeted extraction from a defined pressure accumulator subset is intended to be clarified by way of example once again in FIG. 2. For this purpose, FIG. 2 shows a schematic illustration of an apparatus 10 for supplying a fuel consumer 1 of a vehicle 20 with gaseous fuel according to a second embodiment of the present disclosure. Apart from a coolant pump 4c which is explicitly present in the cooling circuit 4, the basic construction of this fuel supply apparatus 10 corresponds here to the embodiment illustrated in FIG. 1. The highlighting of the uppermost two pressure accumulators 2 in FIG. 2 is intended to clarify the defined pressure accumulator subset here; that is to say the pressure accumulators 2 from which fuel is intended to be extracted specifically in a certain operating phase. Instead of a simultaneous extraction from all of the plurality of pressure accumulators 2, only an extraction from the two emphasized pressure accumulators is therefore intended to take place here. The definition of the pressure accumulator subset, which can vary depending on the current operating conditions, can take place here by means of the valve control device 5. For this purpose, the valve control device 5 can be designed, for example, to define the pressure accumulator subset on the basis of a desired cooling power of the cooling circuit 4, a temperature of the cooling circuit 4, a filling level of the pressure accumulators, a user specification and/or a fuel requirement of the fuel consumer 1. For example, the valve control device 5 can be designed so as, in the event of a currently high desired cooling power of the cooling circuit 4, primarily to define an extraction from only a few pressure accumulators, i.e. a small pressure accumulator subset, in order thereby to bring about a sharp drop in pressure in the corresponding pressure accumulators and therefore a high release of an extraction-induced refrigeration effect. For example, in the case of hydrogen ($c_p$=14.2 kJ/kg/K) at an assumed temperature difference of 100 K to the return temperature of the cooling circuit 4 and with a mass flow, which can conventionally be realized in the motor vehicle sector, of 7.8 g/s, a cooling power of approx. 11 kW would result.

In order to clarify the definition of the pressure accumulator subset, FIG. 3 once again shows a schematic illustration of the embodiment according to FIG. 2 in the event of an extraction from a different pressure accumulator subset at a different operating time. In contrast to the situation shown in FIG. 2, an extraction takes place here from three instead of two pressure accumulators, with other pressure accumulators than in the case of FIG. 2 also being involved at the same time. In addition to a definition of from how many or from which of the pressure accumulators fuel is intended to be extracted, the valve control device 5 can furthermore also be designed to define which quantity of gas or which volume flow is intended to be removed specifically from the corresponding pressure accumulators of the pressure accumulator subset. The valve arrangement 3a can be designed here to control volume flows from the individual pressure accumulators of the defined pressure accumulator subset depending on activation by a valve control device. In other words, the valve arrangement 3a is intended to be able to permit a, preferably continuous or incremental, variation in the volume flows of the respective pressure accumulators. In an advantageous manner, as a result, overall control of the extraction of fuel and of the generation of a refrigeration effect in a manner meeting requirements can be achieved.

FIG. 4 shows a schematic illustration of a motor vehicle 20 in side view according to an embodiment of the present disclosure. The motor vehicle 20, which here merely by way of example is a semitruck, i.e. a vehicle combination consisting of a tractor and a semitrailer, is intended here to comprise a fuel consumer 1 (e.g. an internal combustion engine) and an apparatus 10 for supplying the fuel consumer with gaseous fuel (e.g. natural gas), as described in this document.

Although the present disclosure has been described with reference to certain exemplary embodiments, it is apparent to a person skilled in the art that various amendments may be made and equivalents may be used as a replacement without departing from the scope of the present disclosure. Consequently, the present disclosure is not intended to be limited to the exemplary embodiments which are disclosed, but rather is intended to comprise all of the exemplary embodiments which fall within the scope of the attached patent claims. In particular, the present disclosure also claims protection for the subject matter and the features of the dependent claims independently of the claims to which reference is made.

LIST OF REFERENCE SIGNS 1 fuel consumer
2 a plurality of pressure accumulators
3 extraction device
3a valve arrangement
4 cooling circuit
4a heat exchanger
4b air/coolant heat exchanger
4c coolant pump
5 valve control device
6 housing
10 apparatus for supplying a fuel consumer with fuel
20 vehicle

The invention claimed is:

1. An apparatus for supplying a fuel consumer of a vehicle with gaseous fuel, comprising:
   a) a plurality of pressure accumulators for storing and providing pressurized fuel; and
   b) an extraction device which fluidically connects the plurality of pressure accumulators to the fuel consumer;
   wherein the extraction device is thermally coupled to a cooling circuit of the vehicle; and
   wherein the extraction device comprises the following components:
   $b_1$) a valve arrangement by means of which extraction of fuel from each of the plurality of fuel accumulators can be controlled individually,
   $b_2$) a valve control device which is designed
      to define a pressure accumulator subset which indicates from which of the plurality of pressure accumulators fuel is intended to be extracted, and
      to activate the valve arrangement depending on the defined pressure accumulator subset in such a manner that only fuel from the defined pressure accumulator subset is supplied to the fuel consumer.

2. The apparatus as claimed in claim 1 wherein
   the fuel consumer of the vehicle is a fuel cell, or
   the cooling circuit is for cooling the fuel consumer.

3. The apparatus as claimed in claim 1, characterized in that the valve control device is designed to define the pressure accumulator subset in such a manner that an extraction-induced refrigeration effect which is released upon the extraction of fuel is maximized.

4. The apparatus as claimed in claim 1, characterized in that the valve control device is designed to define the pressure accumulator subset, for increasing an extraction-induced refrigeration effect which is released upon the extraction of fuel, in such a manner that, upon the extraction of fuel, as high a pressure drop as possible takes place in the pressure accumulator subset; and/or upon the extraction of fuel, a higher pressure drop takes place in the pressure accumulator subset than in the event of a uniform extraction from the plurality of pressure accumulators.

5. The apparatus as claimed in claim 1, characterized in that the valve control device is designed to define the pressure accumulator subset to be smaller the greater a current heat input and/or heat input to be expected into the cooling circuit is; and/or the greater a current desired cooling power and/or desired cooling power to be expected of the cooling circuit is.

6. The apparatus as claimed in claim 1, characterized in that the valve control device is designed to empty the plurality of pressure accumulators successively in an extraction phase.

7. The apparatus as claimed in claim 1, characterized in that the extraction device is designed to undertake pressure equalization between the plurality of pressure accumulators in a non-extraction phase.

8. The apparatus as claimed in claim 1, characterized in that that the extraction device is designed to undertake pressure equalization between the plurality of pressure accumulators in an overrun operating phase and/or a recuperation phase of the vehicle.

9. The apparatus as claimed in claim 1, characterized in that the valve control device is designed to define the pressure accumulator subset on the basis of a desired cooling power and/or a temperature of the cooling circuit; and/or to define it on the basis of pressures and/or filling levels of the plurality of pressure accumulators; and/or to define it on the basis of a user specification and/or a fuel requirement of the fuel consumer.

10. The apparatus as claimed in claim 1, characterized in that the valve arrangement is designed to control partial volume flows from the individual pressure accumulators of the defined pressure accumulator subset depending on activation by the valve control device, and the valve control device is designed to define partial volume flows in such a manner that an extraction-induced refrigeration effect which is released upon the extraction of fuel is maximized.

11. The apparatus as claimed in claim 1, characterized in that not all of the plurality of pressure accumulators are pressurized equally.

12. The apparatus as claimed in claim 1, characterized in that the extraction device comprises a pressure-reducing device for reducing the pressure of the pressurized fuel.

13. The apparatus as claimed in claim 12, wherein the pressure-reducing device comprises at least one expansion valve.

14. The apparatus as claimed in claim 1, characterized in that the extraction device is thermally coupled via a heat exchanger to a coolant circulating in the cooling circuit.

15. The apparatus as claimed in claim 1, characterized in that the cooling circuit comprises a coolant pump and/or an air/coolant heat exchanger.

16. The apparatus as claimed in one claim 1, characterized
  a) in that the fuel is hydrogen; and/or
  b) in that the fuel consumer comprises at least one fuel cell and/or an internal combustion engine; and/or
  c) in that the cooling circuit is a cooling circuit for cooling the fuel consumer; and/or
  d) in that the plurality of pressure accumulators are identical and/or are enclosed by a common housing.

17. A vehicle having a fuel consumer and an apparatus for supplying the fuel consumer with gaseous fuel as claimed in claim 1.

18. The vehicle of claim 17, wherein the vehicle is a utility vehicle.

* * * * *